United States Patent
Mu et al.

(10) Patent No.: US 10,961,442 B2
(45) Date of Patent: Mar. 30, 2021

(54) ON-LINE DIVERTING ACID FOR CONTINUOUS INJECTION INTO WATER INJECTION WELLS AND A PREPARATION METHOD THEREOF

(71) Applicant: PetroChina Company Limited, Beijing (CN)

(72) Inventors: Lijun Mu, Beijing (CN); Xianwen Li, Beijing (CN); Hongjun Lu, Beijing (CN); Zhiying Deng, Beijing (CN); Yong Wang, Beijing (CN); Bin Yao, Beijing (CN); Zhenning Ji, Beijing (CN); Suiwang Zhang, Beijing (CN); Xiaobing Lu, Beijing (CN); Zhaojie Song, Beijing (CN); Lei Sui, Beijing (CN); Erzhen Wang, Beijing (CN)

(73) Assignee: PetroChina Company Limited, Beijing (CN)

( * ) Notice: Subject to any disclaimer, the term of this patent is extended or adjusted under 35 U.S.C. 154(b) by 34 days.

(21) Appl. No.: 16/239,712

(22) Filed: Jan. 4, 2019

(65) Prior Publication Data

US 2019/0276730 A1  Sep. 12, 2019

(30) Foreign Application Priority Data

Mar. 12, 2018 (CN) .......................... 201810201156.4

(51) Int. Cl.
 *C09K 8/74* (2006.01)
(52) U.S. Cl.
 CPC ............ *C09K 8/74* (2013.01); *C09K 2208/12* (2013.01); *C09K 2208/32* (2013.01)
(58) Field of Classification Search
 CPC .. C09K 8/74; C09K 2208/12; C09K 2208/32; C09K 8/506
 See application file for complete search history.

(56) References Cited

U.S. PATENT DOCUMENTS

| | | | | |
|---|---|---|---|---|
| 6,703,352 B2 * | 3/2004 | Dahayanake | ............ | C05G 5/20 507/241 |
| 7,237,608 B2 * | 7/2007 | Fu | .......................... | C09K 8/602 166/279 |
| 2005/0061509 A1 | 3/2005 | Nguyen | | |
| 2006/0105919 A1 | 5/2006 | Colaco et al. | | |
| 2012/0184470 A1 * | 7/2012 | Mao | ....................... | C09K 8/584 507/209 |
| 2013/0310285 A1 * | 11/2013 | Fedorov | ................... | C09K 8/74 507/222 |
| 2015/0210913 A1 * | 7/2015 | Gupta | ...................... | C09K 8/86 166/305.1 |

FOREIGN PATENT DOCUMENTS

| | | | |
|---|---|---|---|
| CN | 1861980 | A | 11/2006 |
| CN | 104073236 | | 1/2014 |
| CN | 103571453 | A | 2/2014 |
| CN | 103898514 | * | 7/2014 |
| CN | 103952134 | A | 7/2014 |
| CN | 104232041 | A | 12/2014 |
| CN | 105368439 | * | 3/2016 |
| CN | 105482802 | | 4/2016 |
| RU | 2283952 | * | 6/2009 |

OTHER PUBLICATIONS

Liu et al, Complex based on imidazole ionic liquid and copolymer of acrylamide and phenoxyacetamide modification for clay stabilizer, J. Appl. Polym. Sci. 2015, 41536, 1-11.*
Boeteng et al, Coconut oil and palm oil's role in nutrition, health and national development: A review, Ghana Med J 2016; 50(3): 189-196.*
Hu Zhili et al. Jilin People's Publishing House, Oilfield chemicals and their application, 10 pgs, Dec. 31, 1998.
Sun Yong, "Development of Viscoelastic Surfactant Autonomous Shunt Acid and Study on Acidification Model", China Excellent Doctoral Dissertations Full-text Database (PhD) Engineering Science and Technology Series 1, No. 4, Apr. 15, 2006.
Dong, J., et al., "A New Amphoteric Surfactant Self-diverting Acid System", Drilling Fluid & Completion Fluid, 33(1): 102-106 (Jan. 2016).
Ji-Qin, L., et al., Acid Treatment for Blockage Removal in High Tempature Deep Wells: Laboratory Investigation and Field Uses, 20(1): 5 pgs. (Mar. 2003).

* cited by examiner

*Primary Examiner* — Kumar R Bhushan
(74) *Attorney, Agent, or Firm* — Hamilton, Brook, Smith & Reynolds, P.C.

(57) ABSTRACT

On-line diverting acids for continuous injection into water injection wells and methods of preparing the diverting acid are disclosed. The on-line diverting acids have a raw material composition of: 5.0-25.0% of hydrochloric acid, 3.0%-6.0% of ammonium fluoride, 4.0%-8.0% of a diverting agent, 3.0%-7.0% of a chelating agent, 1.0-3.0% of a corrosion inhibitor, 1.0-3.0% of an anti-swelling/swelled-clay-shrinking agent and a balance of water. The on-line diverting acids can remove plugging from deep zones of high and low permeability layers, and can be continuously injected to simplify the construction process, to achieve the purpose of reducing the pressure and stimulating the injection.

10 Claims, No Drawings

ON-LINE DIVERTING ACID FOR CONTINUOUS INJECTION INTO WATER INJECTION WELLS AND A PREPARATION METHOD THEREOF

RELATED APPLICATION

This application claims priority under 35 U.S.C. § 119 or 365 to Chinese Application No. 2018102011564, filed Mar. 12, 2018. The entire teachings of the above application is incorporated herein by reference.

INVENTION DISCLOSURE

The present disclosure relates to an acid solution, especially an on-line diverting acid for continuous injection into water injection wells, and a preparation method thereof, belonging to the field of petroleum exploitation technology.

BACKGROUND

Acidification is one of the important measures for increasing production and stimulating injection in sandstone reservoirs. However, in the acidification measures for sandstone reservoirs, the acid distribution technique of the acid solution for sand-shale thin interbed, uneven water accepting layer or multi-formation still has the problem of uneven distribution, removing only plugging from high permeability zones but not entering low permeability zones to effectively remove plugging.

At present, the mechanical diverting technology has a strict requirement on construction well condition, and a high construction cost; the foam diversion and polymer diversion has high requirements on reservoir temperature, reservoir permeability and porosity respectively, and they are greatly harmful to formations and cannot easily flow back, thus their use is also limited.

Self-diverting acids or diverting acids, on which many researches focus in recent years, have advantages such as superior diverting performance, good leak-off control and no damage to the reservoir. However, in the field application, it is necessary to keep tripping the tubing string, and inject from the wellbore in multiple steps a prepad fluid, a spacer fluid, a treatment fluid, an overflush fluid, a temporary plugging agent, a diverting agent, a displacement fluid, the treatment fluid and the like; in order to prevent the secondary plugging caused by secondary precipitate formed of residual acid after construction, the acid solution needs to flow back, resulting in complex construction steps, high construction strength, and long construction time.

Therefore, it is a problem to be solved in the art to provide an on-line diverting acid for continuous injection with good diverting, slowing speed and flowback performances.

SUMMARY

To solve the above-mentioned technical problem, an object of the present disclosure is to provide an on-line diverting acid for continuous injection into water injection wells, which can remove plugging from deep zones of high and low permeability layers and achieve the purpose of reducing the pressure and stimulating the injection.

In order to achieve the above technical purpose, the present disclosure provides an on-line acid for continuous injection into water injection wells; wherein with respect to 100 wt % of the total mass of the on-line diverting acid for continuous injection into water injection wells, the on-line diverting acid for continuous injection into water injection wells has a raw material composition of: 5.0-25.0% hydrochloric acid, 3.0%-6.0% ammonium fluoride, 4.0%-8.0% diverting agent, 3.0%-7.0% chelating agent, 1.0-3.0% corrosion inhibitor, 1.0-3.0% anti-swelling/swelled-clay-shrinking agent, and a balance of water, wherein the sum of mass percentages of each raw material in the on-line diverting acid for continuous injection into water injection wells is 100%.

According to a specific embodiment of the present disclosure, both hydrochloric acid and ammonium fluoride used are commercially available chemical pure or industrial pure.

In the on-line diverting acid according to the present disclosure, the above on-line diverting acid for continuous injection into water injection wells has a low concentration of ammonium fluoride, and can effectively erode feldspar and clay in low permeability, ultra-low permeability and dense reservoirs after reacting with hydrochloric acid.

The on-line diverting acid according to the present disclosure employs an on-line injection process, which can replace the multi-step process including "tripping, slug injection, and residual acid flowback treatment etc" in the conventional temporary plugging and acidification. In the field construction, it is not necessary to stop wells, but only to inject the on-line diverting acid together with the injected water into the wellbore without flowing back of the residual fluid, thus achieving "one-step construction" of "no moving the tubing string, no stopping wells, no flowing back, no changing liquid".

In the on-line diverting acid according to the present disclosure, preferably, the diverting acid used is an aqueous solution obtained by oleic acid, long-chain stearic acid and sodium chloroacetate through the reaction of amides and quaternary amines.

In the on-line diverting acid according to the present disclosure, preferably, the diverting agent used is prepared by the following steps:

mixing oleic acid with long-chain stearic acid at 90-110° C. (more preferably 100° C.) and reacting for 6-7 hours (more preferably 7 hours);

adding thereto sodium chloroacetate at 60-70° C. (more preferably 60° C.), and reacting under reflux for 2-3 hours (2 hours) to obtain the diverting agent, wherein the mass ratio of oleic acid, long-chain stearic acid and sodium chloroacetate is (2.5-3):(1-1.5):(1-1.5).

In the on-line diverting acid according to the present disclosure, the diverting agent used can remove plugging from both high permeability layer and low permeability layer. As the on-line diverting acid reacts with the formation, the acid concentration decreases and its own viscosity increases, forming a temporary plugging, so that the subsequent acid solution enters the low permeability layer for removing plugging; in the later stage, as the added amount of the on-line diverting acid decreases to 1%, the network structure is destroyed, the viscosity is reduced, and the temporary plugging performance disappears, ensuring normal water injection into wells.

In the on-line diverting acid according to the present disclosure, preferably, the long-chain stearic acid as used has a carbon number of 14-22.

In the on-line diverting acid according to the present disclosure, preferably, the chelating agent as used is an aqueous solution obtained by mixing citric acid monohydrate and nitrilotriacetic acid in a mass ratio of (2-3):(1-1.5); more preferably, the chelating agent as used is an aqueous solution obtained by mixing citric acid monohydrate and nitrilotriacetic acid in a mass ratio of 2:1.

In the on-line diverting acid according to the present disclosure, preferably, the chelating agent as used has a mass fraction of 20.0%-25.0%; more preferably, the chelating agent as used has a mass fraction of 25%.

In the on-line diverting acid according to the present disclosure, the chelating agent as used can efficiently form chelates with metal ion such as $Ca^{2+}$, $Ba^{2+}$, $Si^{2+}$, and $Fe^{3+}$ to avoid the formation of secondary or tertiary precipitates, slow down the rate of the reaction between the finally obtained on-line diverting acid and the formation, and ensure that the on-line diverting acid can enter the deep zones to remove plugging.

In the on-line diverting acid according to the present disclosure, preferably, the corrosion inhibitor as used is an aqueous solution obtained by mixing triethanolamine, mercaptan amine, acetophenone and anhydrous ethanol in a mass ratio of (1-1.5):(1-1.5):(1-1.5):(1-2); more preferably, the corrosion inhibitor as used is an aqueous solution obtained by mixing triethanolamine, mercaptan amine, acetophenone and anhydrous ethanol in a mass ratio of 1:1:1:1.

In the on-line diverting acid according to the present disclosure, preferably, the corrosion inhibitor as used has a mass fraction of 20.0%-25.0%; more preferably, the corrosion inhibitor as used has the mass fraction of 25%.

In the on-line diverting acid according to the present disclosure, the corrosion inhibitor as used can effectively reduce the corrosion of the metal pipeline caused by the on-line diverting acid, and protect the wellbore string.

In the on-line diverting acid according to the present disclosure, the anti-swelling/swelled-clay-shrinking agent as used can prevent the clay lattice from swelling when exposed to water, and also prevent the swelled clay lattice from shrinking. Preferably, the anti-swelling/swelled-clay-shrinking agent as used is aqueous ammonium chloride solution with a mass concentration of 45 to 55%; more preferably, the anti-swelling/swelled-clay-shrinking agent as used is aqueous ammonium chloride solution with the mass concentration of 50%.

In the on-line diverting acid according to the present disclosure, the anti-swelling/swelled-clay-shrinking agent as used can reduce clay migration, water sensitivity and water locking damage in reservoir, superiorly reducing the influence of the injected water on the formation permeability.

The present disclosure also provides a method for preparing the on-line diverting acid for continuous injection into water injection wells, including the following steps:

sequentially adding hydrochloric acid, ammonium fluoride to water and stirring (to be uniform) under normal temperature;

sequentially adding thereto the diverting agent, the chelating agent, the corrosion inhibitor, the anti-swelling/swelled-clay-shrinking agent and stirring (to be uniform) so as to obtain the on-line diverting acid for continuous injection into water injection wells.

In the preparation method according to the present disclosure, the used experimental equipment, such as beaker and stirring rod, should be made of plastic material, such as plastic beaker and plastic stirring rod, so as to avoid the reaction of the equipment of glass material with the acid solution to affect the results.

The on-line diverting acid for continuous injection into water injection wells according to the present disclosure can be used for acidification of high permeability, low permeability, ultra-low permeability and dense reservoirs. When the on-line diverting acid is used for acidification and plugging removal in water injection wells with uneven water accepting and formation plugging, it is not necessary to stop the wells, but to inject it into water injection wells together with the injected water without flowing back the residual solution. The added amount of the on-line diverting acid is 30.0%-50.0%, wherein the best result is at a ratio of acid to water of 1:1.

The on-line diverting acid for continuous injection into water injection wells according to the present disclosure has good diverting, slowing speed, inhibiting corrosion and chelating performances.

The on-line diverting acid for continuous injection into water injection wells according to the present disclosure can reduce the damage to reservoir caused by water sensitivity and salt sensitivity, prevent the residual acid from reacting with the formation minerals to form secondary precipitates, and achieve no flowback of the residual acid.

The on-line diverting acid for continuous injection into water injection wells according to the present disclosure can enter the deep zones, and remove plugging from both high and low permeability layers.

In the field construction, the on-line diverting acid for continuous injection into water injection wells according to the present disclosure can be continuously injected without flowback and movement of tubing string during the field construction, and has a construction characteristic of "one step driving multiple steps", thus simplifying the construction process and reducing the labor intensity.

The on-line diverting acid for continuous injection into water injection wells according to the present disclosure has a good compatibility with the formation water/injected water.

The preparation method of the on-line diverting acid for continuous injection into water injection wells according to the present disclosure is simple with a short reaction time.

DETAILED DESCRIPTION

Now the technical solutions of the present disclosure will be described in detail below, in order to have a clearer understanding of the technical features, purposes and beneficial effects of the present disclosure, but it should not be construed as limiting the implementable scope of the present disclosure.

Example 1

Example 1 provides an on-line diverting acid for continuous injection into water injection wells, which is composed of the following raw materials: 20.0% hydrochloric acid, 4.0% ammonium fluoride, 7.0% diverting agent, 6.0% chelating agent, 2.5% corrosion inhibitor, 2.0% anti-swelling/swelled-clay-shrinking agent, and a balance of water. The sum of mass percentages of each raw material in the on-line diverting acid for continuous injection into water injection wells is 100%.

In the on-line diverting acid, both hydrochloric acid and ammonium fluoride used are commercially available chemical pure or industrial pure;

the anti-swelling/swelled-clay-shrinking agent as used is aqueous ammonium chloride solution with a concentration of 50%;

the diverting agent as used is an aqueous solution obtained by oleic acid, octadecanoic acid and sodium chloroacetate through the reaction of amides and quaternary amines;

the chelating agent as used is an aqueous solution with the mass fraction of 25.0%, obtained by mixing citric acid monohydrate and nitrilotriacetic acid in a mass ratio of 2:1;

the corrosion inhibitor as used is an aqueous solution with a mass fraction of 25.0%, obtained by mixing triethanolamine, mercaptan amine, acetophenone and anhydrous ethanol in a mass ratio of 1:1:1:1.

The present example also provides a method for preparing the above on-line diverting acid for continuous injection into water injection wells, including the following steps:

sequentially adding water, hydrochloric acid, ammonium fluoride to a plastic beaker, and stirring well with a plastic rod;

sequentially adding thereto the diverting agent, the chelating agent, the corrosion inhibitor, the anti-swelling/swelled-clay-shrinking agent and stirring well with the rod, so as to obtain the on-line diverting acid for continuous injection into water injection wells.

Example 2

The present Example provides an on-line diverting acid for continuous injection into water injection wells, which comprises: 15.0% hydrochloric acid, 3.0% ammonium fluoride, 4.0% diverting agent, 3.5% chelating agent, 1.0% corrosion inhibitor, 1.5% anti-swelling/swelled-clay-shrinking agent and a balance of water. The sum of mass percentages of each raw material in the on-line diverting acid for continuous injection into water injection wells is 100%.

In the on-line diverting acid, both hydrochloric acid and ammonium fluoride used are commercially available chemical pure or industrial pure;

the anti-swelling/swelled-clay-shrinking agent as used is aqueous ammonium chloride solution with a concentration of 50%;

the diverting agent as used is an aqueous solution obtained by oleic acid, stearic acid and sodium chloroacetate through the reaction of amides and quaternary amines;

the chelating agent as used is an aqueous solution with the mass fraction of 25.0%, obtained by mixing citric acid monohydrate and nitrilotriacetic acid in a mass ratio of 2:1;

the corrosion inhibitor is an aqueous solution with a mass fraction of 25.0%, obtained by mixing triethanolamine, mercaptan amine, acetophenone and anhydrous ethanol in a mass ratio of 1:1:1:1.

The basic characteristics of the on-line diverting acid in this Example as measured by experiments are shown in Table 1.

TABLE 1 the ability of different acid solutions to inhibit the precipitation of metal ions

| Acid solution | Inhibition rate of calcium fluoride(%) | Inhibition rate of Na2SiF6 (%) | Inhibition rate of Al(OH)3 (%) | Inhibition rate of Fe(OH)3 (%) | Corrosion rate (g/m2 · h) |
|---|---|---|---|---|---|
| earic acid | — | — | — | — | 2.5036 |
| polyhydric acid | 61.33% | 31.45% | 26.41% | 36.27% | 0.9848 |
| On-line diverting acid | 98.81% | 92.25% | 95.38% | 96.22% | 0.2812 |

Table 1 shows that the on-line diverting acid in this Example has a strong chelating ability to avoid the formation of secondary and tertiary precipitates such as calcium fluoride, iron hydroxide and aluminum hydroxide, thus providing the reference for the construction without flowback; meanwhile, its corrosion rate is only 0.28 g/m$^2$·h, which is far less than the industry primary standard (3.0 g/m$^2$·h), which provides the basis for acidification without moving the tubing string, and has a good value for practical application.

Example 3

The present Example provides an on-line diverting acid for continuous injection into water injection wells, which comprises: 25.0% hydrochloric acid, 4.0% ammonium fluoride, 6.0% diverting agent, 5.0% chelating agent, 2.5% corrosion inhibitor, 3.0% anti-swelling/swelled-clay-shrinking agent and a balance of water. The sum of mass percentages of each raw material in the on-line diverting acid for continuous injection into water injection wells is 100%.

In the on-line diverting acid, both hydrochloric acid and ammonium fluoride used are commercially available chemical pure or industrial pure;

the anti-swelling/swelled-clay-shrinking agent as used is aqueous ammonium chloride solution with a concentration of 50%;

the diverting agent as used is an aqueous solution obtained by oleic acid, stearic acid and sodium chloroacetate through the reaction of amides and quaternary amines;

the chelating agent as used is an aqueous solution with the mass fraction of 25.0%, obtained by mixing citric acid monohydrate and nitrilotriacetic acid in a mass ratio of 2:1;

the corrosion inhibitor is an aqueous solution with a mass fraction of 25.0%, obtained by mixing triethanolamine, mercaptan amine, acetophenone and anhydrous ethanol in a mass ratio of 1:1:1:1.

The basic characteristics of the on-line diverting acid in this Example as measured by experiments are shown in Table 2.

TABLE 2 the ability of different acid solutions to inhibit the precipitation of metal ions

| Acid solution | Inhibition rate of calcium fluoride(%) | Inhibition rate of Na$_2$SiF$_6$ (%) | Inhibition rate of Al(OH)$_3$ (%) | Inhibition rate of Fe(OH)$_3$ (%) | Corrosion rate (g/m$^2$ · h) |
|---|---|---|---|---|---|
| earic acid | — | — | — | — | 2.4985 |
| polyhydric acid | 60.25% | 33.24% | 27.42% | 35.41% | 0.9589 |
| on-line diverting acid | 97.85% | 91.45% | 94.58% | 95.84% | 0.3022 |

The evaluation results show that the on-line diverting acid in this Example has a strong chelating ability to avoid the formation of secondary and tertiary precipitates such as calcium fluoride, iron hydroxide, and aluminum hydroxide, thus providing the reference for the construction without flowback; meanwhile, its corrosion rate is only 0.30 g/m2·h, which is far less than the industry primary standard (3.0 g/m2·h), which provides the basis for acidification without moving the tubing string, and has a good value for practical application.

Example 4

The present Example uses the on-line diverting acid for continuous injection into water injection wells of Examples 2 and 3 in 4 plugged wells caused by inorganic scale and clay swelling and migration in Changqing Oilfield for construction, wherein the construction result of Example 2 is shown in Table 3, and the construction result of Example 3 is shown in Table 4.

TABLE 3

| | Before construction | | | | After construction | | | |
| --- | --- | --- | --- | --- | --- | --- | --- | --- |
| Well number | Oil pressure (MPa) | Casing pressure (MPa) | Injection proration (m$^3$) | Daily injection (m$^3$) | Oil pressure (MPa) | Casing pressure (MPa) | Injection proration (m$^3$) | Daily injection (m$^3$) |
| Well Z309-781 | 23.0 | 22.9 | 15 | 4 | 18.9 | 18.7 | 15 | 15 |
| Well N138 | 19.0 | 19.0 | 22 | 15 | 14.0 | 14.0 | 22 | 22 |

TABLE 4

| | Before construction | | | | After construction | | | |
| --- | --- | --- | --- | --- | --- | --- | --- | --- |
| Well number | Oil pressure (MPa) | Casing pressure (MPa) | Injection proration (m$^3$) | Daily injection (m$^3$) | Oil pressure (MPa) | Casing pressure (MPa) | Injection proration (m$^3$) | Daily injection (m$^3$) |
| Well Z164 | 21.7 | sealed | 18 | 6 | 15.5 | sealed | 18 | 18 |
| Well H01-9 | 21.5 | 21.5 | 15 | 3 | 20.0 | 20.0 | 15 | 15 |

It can be seen from Table 3 and Table 4 that the on-line diverting acid for continuous injection into water injection wells of Example 2 and Example 3 can effectively increase the water injection volume into the water injection wells, reduce the wellhead pressure in the water injection wells, improve the water accepting profile, improve the flow of formation fluid, and increase the water injection volume into the water injection wells, which has a good value for practical application. Specifically, the acid solution has a good compatibility with the formation water/injection water, does not produce precipitate to plug the formation, and is directly diluted by injected water in wellbore and used during site construction; the acid solution is a weak polyhydric acid, and releases H$^+$ by stepwise ionization in the solution, thus slowing down the reaction rate of acid and rock, ensuring that the acid solution enters the deep zone to form a temporary plugging barrier, and at the same time removing the plugging material such as calcium carbonate scale, and calcium sulfate scale produced by the incompatibility of the injected water with the formation water in the high and low permeability zones, reducing the damage to reservoir caused by water sensitivity and salt sensitivity, preventing the residual acid from reacting with the formation minerals to form secondary precipitates, achieving no flowback, and finally simplifying the construction steps to replace multiple steps such as prepad fluid, spacer fluid, treatment fluid, overflush fluid, temporary plugging agent, diverting agent, displacement fluid, treatment fluid in the existing diverting acid with one acid solution, thus achieving the purpose of shortening the construction time, decreasing working intensity on the spot, and reducing the pressure and stimulating the injection in water injection wells with uneven water acceptation.

The invention claimed is:

1. An on-line diverting acid for continuous injection into water injection wells, which is characterized in that, with respect to 100 wt % of the total mass of the on-line diverting acid for continuous injection into water injection wells, the on-line diverting acid for continuous injection into water injection wells has a raw material composition comprising: 5.0-25.0% of hydrochloric acid, 3.0%-6.0% of ammonium fluoride, 4.0%-8.0% of a diverting agent, 3.0%-7.0% of a chelating agent, 1.0-3.0% of a corrosion inhibitor, 1.0-3.0% of anti-swelling/swelled-clay-shrinking agent and a balance of water, wherein the sum of mass percentages of each raw material in the on-line diverting acid for continuous injection into water injection wells is 100%,
wherein the diverting agent is prepared by:
mixing oleic acid with stearic acid at 90-110° C. and reacting for 6-7 hours; and
adding thereto sodium chloroacetate at 60-70° C., and reacting under reflux for 2-3 hours to obtain the diverting agent, wherein the mass ratio of oleic acid, stearic acid and sodium chloroacetate is (2.5-3):(1-1.5):(1-1.5).

2. The on-line diverting acid according to claim 1, wherein the chelating agent is an aqueous solution obtained by mixing citric acid monohydrate and nitrilotriacetic acid in a mass ratio of (2-3):(1-1.5).

3. The on-line diverting acid according to claim 2, wherein the chelating agent has a mass fraction of 20.0%-25.0% aqueous solution.

4. The on-line diverting acid according to claim 3, wherein the chelating agent has a mass fraction of 25% aqueous solution.

5. The on-line diverting acid according to claim 1, wherein the corrosion inhibitor is an aqueous solution comprising triethanolamine, mercaptan amine, acetophenone and anhydrous ethanol in a mass ratio of (1-1.5):(1-1.5):(1-1.5):(1-2).

6. The on-line diverting acid according to claim 5, wherein the corrosion inhibitor has a mass fraction of 20.0%-25.0% aqueous solution.

7. The on-line diverting acid according to claim 6, where the corrosion inhibitor has a mass fraction of 25% aqueous solution.

8. The on-line diverting acid according to claim 1, wherein the anti-swelling/swelled-clay-shrinking agent is aqueous ammonium chloride solution with a mass concentration of 45 to 55% aqueous solution.

9. The on-line diverting acid according to claim 8, wherein the anti-swelling/swelled-clay-shrinking agent is aqueous ammonium chloride solution with a mass concentration of 50% aqueous solution.

10. A method for preparing the on-line diverting acid for continuous injection into water injection wells according to claim 1, the method comprising:
   sequentially adding hydrochloric acid, ammonium fluoride to water and stirring under normal temperature; and
   sequentially adding thereto the diverting agent, the chelating agent, the corrosion inhibitor, the anti-swelling/swelled-clay-shrinking agent and stirring, so as to obtain the on-line diverting acid for continuous injection into water injection wells.

* * * * *